No. 856,366.  
PATENTED JUNE 11, 1907.
E. QUACK.  
GAS STOVE.  
APPLICATION FILED DEC. 29, 1906.
2 SHEETS—SHEET 1.
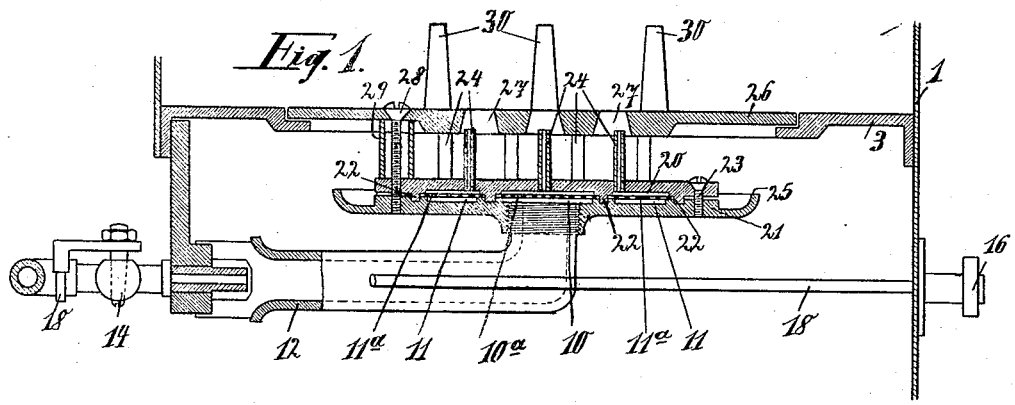
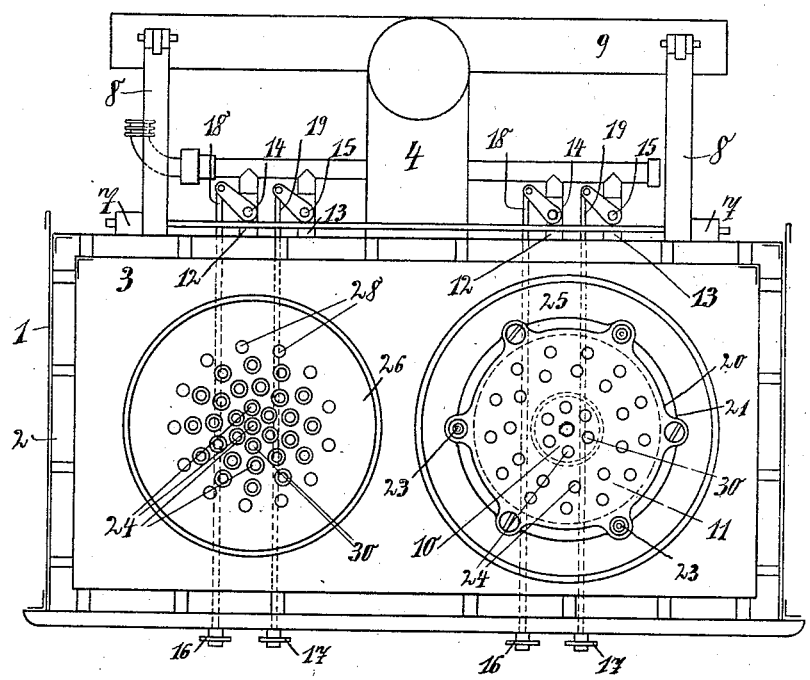
Witnesses:  
Wilhelm Schauer  
Herm. Weber
Inventor:  
Eduard Quack  
By Wilhelm Kirschbaum  
Attorney.

No. 856,366. PATENTED JUNE 11, 1907.
E. QUACK.
GAS STOVE.
APPLICATION FILED DEC. 29, 1905.
2 SHEETS—SHEET 2.
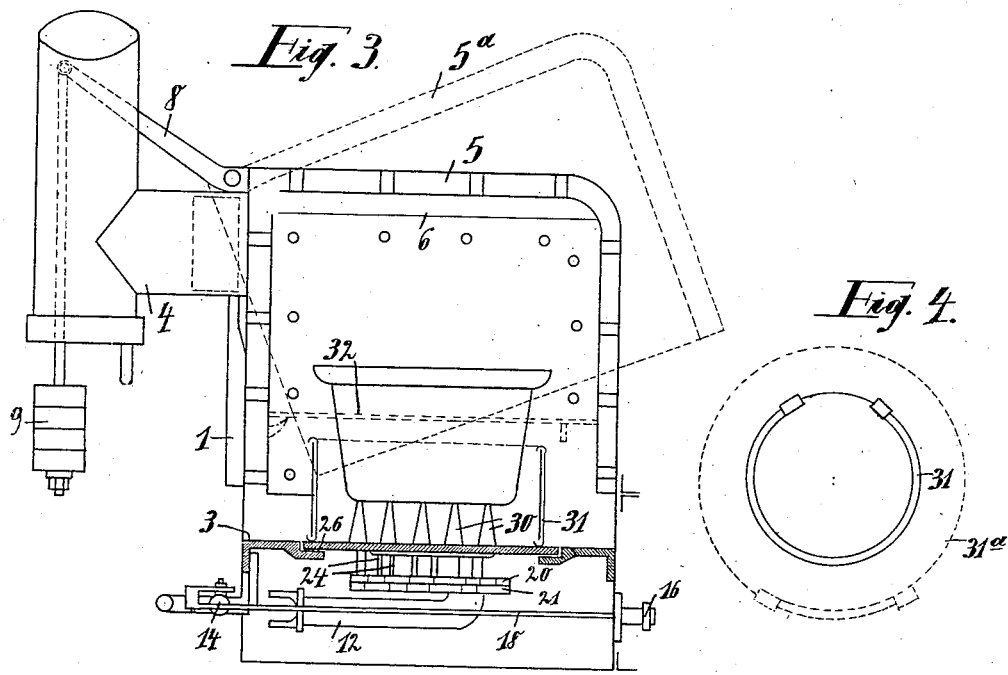
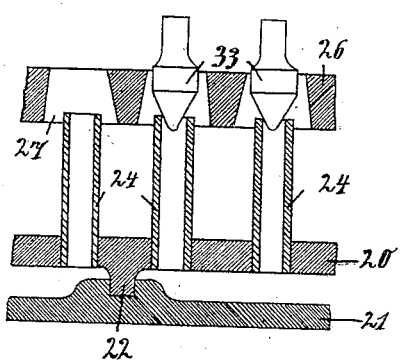
Witnesses:
Wilh. Schauer
Herm. Webb
Inventor:
Edward Quack
By Wilhelm Kirschbaum
Attorney

UNITED STATES PATENT OFFICE.

EDUARD QUACK, OF ELBERFELD, GERMANY.

GAS-STOVE.

No. 856,366.	Specification of Letters Patent.	Patented June 11, 1907.

Application filed December 29, 1906. Serial No. 350,050.

*To all whom it may concern:*

Be it known that I, EDUARD QUACK, a subject of the German Emperor, and a resident of Elberfeld, Germany, have invented certain new and useful Improvements in Gas-Stoves, of which the following is a specification.

This invention relates to a gas stove which is especially designed to serve as cooking stove but which can be also used at the same time as heating stove.

The improvements consist in that:—1, the heat produced by the stove can be easily regulated to any desired degree; and 2, the loss of heat, which with hitherto known gas stoves was due to the escape of imperfectly burnt gases or to the supply of superfluous air, is effectively avoided.

The accompanying drawings show the gas stove embodying the invention.

Figure 1 is a sectional elevation of the burner arrangement, and Fig. 2 a plan of a gas stove with two fire places, the cover of the stove being omitted to show the interior of the same; while Fig. 3 is a sectional side view of the gas stove. Fig. 4 shows an adjustable envelop which is to be placed around the lower part of a cooking vessel inserted in the gas stove; Fig. 5 shows the way in which the single burner tubes can be closed so as to use only one or some of them in order to regulate the heat to the desired degree.

The gas stove comprises a casing 1 which is made of double walls with a space 2 left between them, and closed near its bottom by a base plate 3 in such a manner that the interior of the casing remains in communication with a flue-pipe 4 which is introduced into the outer rear wall of the casing. The casing 1 is closed at its top by a cover 5 which is also made of double walls and integral with the double front wall of the casing and disposed so as to leave a space 6 between its bottom and the top edge of the inner side walls of the casing and hingedly connected to the outer rear wall of the casing at 7 and counterweighted by the balance lever 8 and weight 9 so that it is always kept in balance when being opened as shown by the dotted lines at $5^a$ in Fig. 3. The outer side walls project somewhat above the cover 5 when the latter is closed so as to insure the best possible tightness of the casing The casing 1 may be provided with one, two or more fire places, two being shown on the drawings.

Each fire place is fitted with a burner arrangement which comprises two separate concentrically arranged gas chambers 10 and 11 each of which is supplied with gas through a separate gas supply pipe 12 and 13 respectively which are each controlled by a tap 14 and 15 respectively adapted to be operated from a knob 16 and 17 respectively provided at the front of the casing 1, through the medium of a pivotal connecting-rod 18 and 19 respectively. The two gas chambers 10 and 11 are each fitted with a wire gauze strainer $10^a$ and $11^a$ respectively in order to allow a good distribution of the gas over their total area. The concentric gas chambers 10 and 11 are formed of two superposed grooved plates 20 and 21 of which the upper one 20 tightly fits with its projections 22 into corresponding notches in the lower one 21 to which it may be also fixed by means of screws 23 or in any other suitable manner. The top plate 20 is fitted with two series of burner tubes 24 of which one is in communication with one gas chamber 10 and the other one with the other gas chamber 11. The top plate 20 is somewhat inclined toward its circumference so that any soot or other impurities settling on the burner tubes 24 can gradually slide down, or be swept down, this inclination from where they fall then into a cup 25 forming the outer circumference of the bottom plate 21, so that greatest cleanliness is insured. This burner arrangement as just described, is now placed beneath a ring plate 26 which is inserted in a corresponding opening of the base plate 3 of the casing 1, in such a manner that the burner tubes 24 project somewhat into correspondingly disposed conical holes 27 of this ring plate 26, while the rigid attachment to the latter is effected by means of screws 28 passed through the ring plate 26, distance members 29 and the top plate 20, and screwed into the bottom plate 21.

Now in order to place a cooking vessel or the like above the burner tubes 24, the ring plate 26 is provided with a series of small pillars 30. To concentrate the heat produced by the burner flames, most effectively onto the cooking vessel, the same may be surrounded at its lower part by an envelop 31 which is so constructed that it can be adjusted to any necessary width to suit different diameters of vessel, as this is indicated in Fig. 4 by the dotted lines at $31^a$.

The stove may be also used as baking oven, in which case the whole upper part of the casing 1 must be closed toward the burner compartment, which may be effected by means of a detachable partition 32 as shown in dotted lines in Fig. 3, on which partition the goods to be baked are placed directly or through the medium of a grate or the like. The products of combustion flow then through the space 2 from down below into the flue 4, while in the former case, i. e. when the stove is used as cooking stove, they are, besides, taking the same way as just mentioned, allowed to flow also through the space 6 into the flue 4.

In order to regulate the stove to any desired production of heat, it is simply necessary to use either one of the two burner tube series only or both of them. To increase further the possible variance of regulation of the heating degree, loose conical stoppers 33 (see Fig. 5) may be provided which can, if desired, be placed on top of one or more burner tubes 24 to suit the desired degree of heat.

The whole burner arrangement is so made that it can be easily taken asunder when necessary, and again quickly put together.

Having fully described my invention what I claim and desire to secure by Letters Patent is:—

1. A gas stove comprising in combination with a cooking vessel or the like, a double-wall casing (1) with conical holes in its base plate, a cover hinged to said casing and integral with the front wall of the latter, a flue-pipe attached to the rear wall of said casing, a burner arrangement placed below the base plate of said casing so as to project with its burner tubes into the conical holes of said base plate and adapted to be regulated to any desired degree, small pillars (30) provided on the base plate of said casing and adapted to support said cooking vessel, and an envelop (31) placed around the lower part of said cooking vessel and adapted to be adjusted so as to suit any width of cooking vessel, substantially as described and shown.

2. A gas stove comprising in combination a double-wall casing (1) with conical holes in its base-plate, a cover hinged to said casing and integral with the front wall of the latter, a flue-pipe attached to the rear wall of said casing, a burner arrangement placed below the base plate of said casing so as to project with its burner tubes into the conical holes of said base plate and adapted to be regulated to any desired degree, and a detachable partition (32) placed in said casing and adapted to close the whole upper part of said casing toward the burner compartment, so as to use the stove as baking oven, substantially as described and shown.

In testimony whereof I have hereunto set my hand in the presence of two subscribing witnesses.

EDUARD QUACK.

Witnesses:
 OTTO KÖNIG,
 J. A. RITTERSHAUS.